(12) United States Patent
Shimosakoda

(10) Patent No.: US 6,982,994 B2
(45) Date of Patent: Jan. 3, 2006

(54) SYNCHRONIZATION CORRECTION CIRCUIT

(75) Inventor: Yoshinori Shimosakoda, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 923 days.

(21) Appl. No.: 09/899,055

(22) Filed: Jul. 6, 2001

(65) Prior Publication Data

US 2001/0046241 A1    Nov. 29, 2001

(30) Foreign Application Priority Data

Feb. 26, 2001 (JP) .............................. 2001/050135

(51) Int. Cl.
    *H04J 3/06*    (2006.01)
(52) U.S. Cl. ...................................... 370/509; 370/520
(58) Field of Classification Search ........ 370/503–507, 370/509, 510–512, 516, 518, 520
    See application file for complete search history.

(56) References Cited

U.S. PATENT DOCUMENTS 5,570,370 A * 10/1996 Lin ............................. 370/347
5,757,869 A *  5/1998 Sands et al. ................. 375/366
5,953,378 A *  9/1999 Hotani et al. ............... 375/341
5,963,605 A * 10/1999 Yasui .......................... 375/368
6,278,718 B1 * 8/2001 Eschholz ..................... 370/503

OTHER PUBLICATIONS

Naoki Sugiyama, "Core Technologies of Bluetooth System", SPA vol. 67(3), pp. 53-56, Oct. 2000.

* cited by examiner

*Primary Examiner*—Bob Phunkulh
*Assistant Examiner*—Ian N. Moore
(74) *Attorney, Agent, or Firm*—Volentine Francos & Whitt, PLLC

(57) ABSTRACT

The synchronization signal generating section generates a packet synchronization signal PSYNC such that it is synchronized with the cycle of packets received from the master device. The interface control section generates a transfer clock PCMCLK used in transferring the data in the packets, from the internal clock. The interface control section measures the cycle of the packet synchronization signal PSYNC, and if the actual cycle of PSYNC is longer than the designated value, it makes the cycle of the transfer clock corresponding to the last data element in the packet longer than the cycle of the transfer clock corresponding to the other data elements, whereas if the actual cycle of PSYNC is shorter than the designated value, it makes the cycle of the transfer clock corresponding to the last data element in the packet shorter than the cycle of the transfer clock corresponding to the other data elements.

8 Claims, 17 Drawing Sheets

Prior Art

*Prior Art*

Prior Art

SYNCHRONIZATION CORRECTION CIRCUIT

BACKGROUND OF THE INVENTION

1. Field of the Invention

The present invention relates to a synchronization correction circuit for correcting synchronization between a packet transmission cycle and a transfer clock in a receiving device. The synchronization correction circuit according to the present invention is applied, for example, to a Bluetooth-compliant audio data processing circuit.

2. Description of Related Art

A conventional synchronization correction circuit will hereinafter be described with reference to an example where such a circuit is applied to a Bluetooth-compliant audio data processing circuit.

"Bluetooth" is one type of specification for data communications between terminals or other devices. This specification applies to various types of data communications conducted between personal computers, printers, mobile telephones, and the like, principally involving audio data.

In a Bluetooth system, communications are conducted using packets. In other words, for a sound communication packet, a packet comprising a synchronization word which is called "sync word" for short, and a payload section is used, as illustrated in FIG. 14. Here, the sync word is used by the receiver to determine the packet transmission interval. Furthermore, audio data is contained in the payload section. There are three types of packets respectively allowing an audio data volume of 10 bytes, 20 bytes and 30 bytes, to be stored in the payload section of each packet. Bluetooth specifies respective packet transmission intervals of 1.25 ms, 2.5 ms and 3.75 ms for these types of packets.

In Bluetooth, one of the communication devices, or the like, is set as a master device, the other is taken as a slave device, and bi-directional communications are conducted therebetween by means of time division multiplexing. In other words, the terminal, or the like, set as the master determines the packet transmission interval, and the terminal, or the like, set as the slave is synchronized therewith and communications are conducted therebetween. The master/slave relationship is determined by an appropriate method, for each communication. FIG. 15 is a conceptual diagram for illustrating a Bluetooth communications system. FIG. 15(A) indicates type I, namely, a case where the payload section contains 10 bytes and the packet transmission interval is 1.25 ms; FIG. 15(B) indicates type II, namely, a case where the payload section contains 20 bytes and the packet transmission interval is 2.5 ms; and FIG. 15(C) indicates type III, namely, a case where the payload section contains 30 bytes and the packet transmission interval is 3.75 ms.

FIG. 16 is a block diagram showing the composition of a conventional audio data processing circuit for use with Bluetooth. As shown in FIG. 16, this audio data processing circuit 1600 comprises a baseband processing section 1610 and 1620 are connected respectively via a bus 1630 to a CPU (Central Processing Unit) 1640. During reception, the baseband processing section 1610 extracts the payload sections from the packets and sends same to the audio data converting section 1620, whereas during transmission, it generates packets for transmitting audio data received from the audio data converting section 1620. During reception, the audio data converting section 1620 converts audio data received from the baseband processing section 1610, as necessary, and sends same to the PCM (Pulse Code Modulation) codec interface circuit in a subsequent stage, whereas during transmission, it re-converts audio data received from the PCM codec interface circuit, as necessary, and sends same to the baseband processing section 1610. Bluetooth is compatible with three types of audio data format: CVSD (Continuous Variable Slope Data modulation), A-law and $\mu$-law. On the other hand, the PCM codec interface circuit is compatible with three types of audio data format: Linear, A-law and $\mu$-law.

A transfer synchronization signal PCMSYNC and transfer clock PCMCLK are used for sending and receiving data between the audio data converting section 1620 and the PCM codec interface circuit. FIG. 17 illustrates a case where 8-bit/word monoaural data is sampled as 8 kHz. As is understood from the timing chart shown in FIG. 17, the transfer synchronization signal PCMSYNC specifies the transfer cycle for each word, and the transfer clock PCMCLK specifies the transfer timing for each bit forming the audio data (PCM data). One word may also be composed by 16 bits. In the case of an 8 kHz cycle for the transfer synchronization signal PCMSYNC, the cycle of the transfer clock PCMCLK will be 64 kHz or above (for 8-bit/word) or 128 kHz or above (for 16-bit/word).

Generally, the transfer clock PCMCLK is generated by the system clock of the audio data processing circuit 1600. Furthermore, the transfer synchronization signal PCMSYNC is generated by the transfer clock PCMCLK.

In communications using an audio data processing circuit 1600 of this kind (see FIG. 16), the packet transmission cycle is determined by means of the transfer synchronization signal PCMSYNC from the transmitter circuit (in other words, the circuit generating the packets). Therefore, the transmission period for the PCM data stored in this packet (see FIG. 17) is also determined by synchronization with the transfer synchronization signal PCMSYNC from the transmitter. However, the transfer synchronization signal PCMSYNC used by the receiver terminal is generated within the receiver circuit 1600. In other words, in FIG. 17, whereas the PCM data is generated so as to be synchronized with the system clock of the transmitter-side audio data processing circuit 1600, the transfer synchronization signal PCMSYNC and transfer clock PCMCLK are generated so as to be synchronized with the system clock of the receiver-side audio data processing circuit 1600.

Here, in cases where the two audio data processing circuits 1600, 1600 conducting communications are running at absolutely the same operating frequency, the PCM data and the transfer synchronization signal PCMSYNC in FIG. 17 will assume completely synchronized states. However, in actual practice, there is often a disparity between the operating frequencies of the receiver-side circuit 1600 and the transmitter-side circuit 1600. If the two circuits 1600, 1600 have different operating frequencies, then the PCM data will not be synchronized completely with the operating clock PCMCLK and the transfer synchronization signal PCMSYNC.

FIG. 18 is a timing chart giving a conceptual illustration of one example of a state where the transfer synchronization signals PCMSYNC of the master and slave do not coincide. In the example in FIG. 18, the frequency of the transfer synchronization signal PCMSYNC generated by the master device is higher than the frequency of the transfer synchronization signal PCMSYNC generated by the slave device. Therefore, on the slave side, the frequency of the received PCM data will be too high compared to the frequency of the transfer synchronization signal PCMSYNC. Consequently, an underflow will be created in the slave device when the received PCM data is transferred from the audio data converting section 1620 to the PCM codec interface circuit. In the master device, on the other hand, the frequency of the received PCM data will be too low compared to the frequency of the transfer synchronization signal PCMSYNC. Therefore, an overflow will be created in the master device when the received PCM data is transferred from the audio data converting section 1620 to the PCM codec interface circuit. If an underflow or overflow arises in the transfer of PCM data from the audio data converting section 1620 to the PCM codec interface circuit, then as a consequence, the communication quality will decline.

SUMMARY OF THE INVENTION

An object of the present invention is to provide a synchronization correction circuit for correcting divergence in synchronization between a master and a slave.

For this purpose, the synchronization correction circuit according to the present invention comprises: a synchronization signal generating section and an interface control section. The synchronization signal generating section successively receives packets generated in accordance with a designated cycle, from an external source, and generates a packet synchronization signal in synchronization with the reception cycle of these packets. The interface control section generates a transfer clock for each respective data element contained in the packets, on the basis of an internal clock. Additionally, the interface control section makes the cycle of the transfer clock corresponding to the last data element of the packet longer than the transfer clocks corresponding to the other data elements, if the actual cycle of the packet synchronization signal is longer than the designated cycle, and makes the cycle of the transfer clock corresponding to the last data element of the packet shorter than the transfer clocks corresponding to the other data elements, if the actual cycle of the packet synchronization signal is shorter than the designated cycle.

With such composition, it is possible to correct the cycle of the transfer clock in such a manner that it is synchronized with the packet reception cycle.

BRIEF DESCRIPTION OF THE DRAWINGS

The foregoing and other objects, features and advantages of the present invention will be better understood from the following description taken in connection with the accompanying drawings, in which.

DESCRIPTION OF THE PREFERRED EMBODIMENTS

Figure 1:
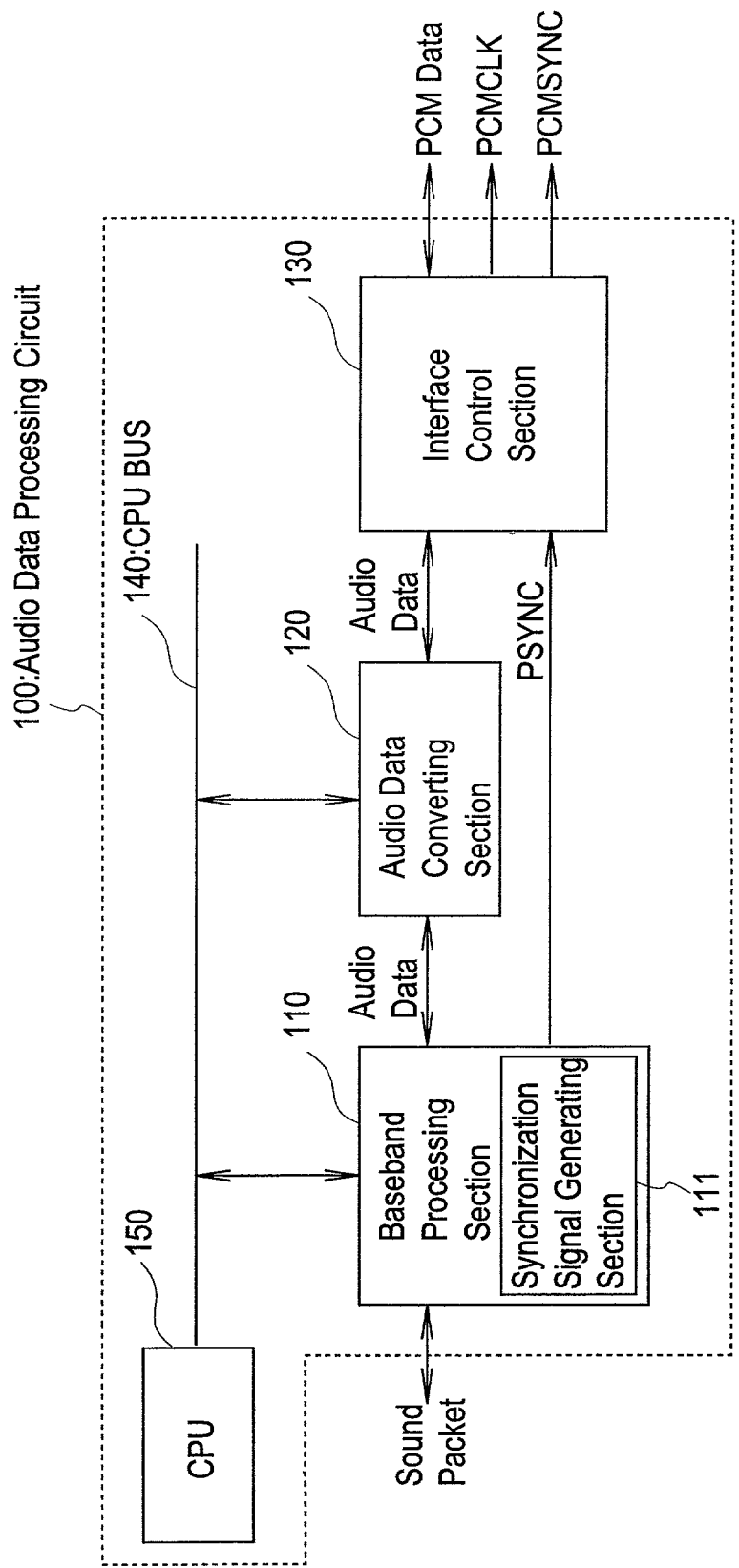
FIG. 1 is a block diagram showing the composition of a synchronization correction circuit according to a first embodiment of the present invention.

With reference to the drawings, embodiments of a synchronization correction circuit according to the present invention will be hereinafter be described. It should be noted that these drawings show an outline of size, shape and positional arrangement of the respective constituent parts only to an extent necessary for appreciating the present invention, and consequently, the present invention is not limited to the examples shown in the drawings. Also, the numerical values in the following explanation are merely examples, and not intended to limit the present invention in any way.

First Embodiment

Below, a synchronization correction circuit according to a first embodiment of the present invention will be described with reference to FIG. 1 to FIG. 5, taking an example where the synchronization correction circuit is employed in a Bluetooth audio data processing circuit.

FIG. 1 is a block diagram showing the composition of an audio data processing circuit according to this embodiment. As shown in FIG. 1, the audio data processing circuit 100 comprises: a baseband processing section 110, an audio data converting section 120, an interface control section 130, a CPU bus 140, and a CPU 150.

Figure 14:
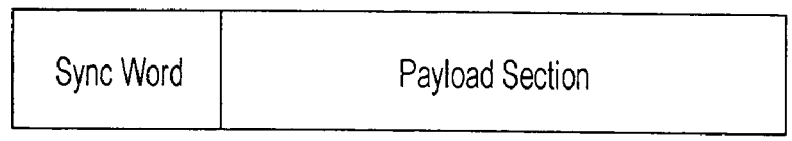
FIG. 14 is a conceptual diagram illustrating a packet structure for audio data.
Figure 15A:
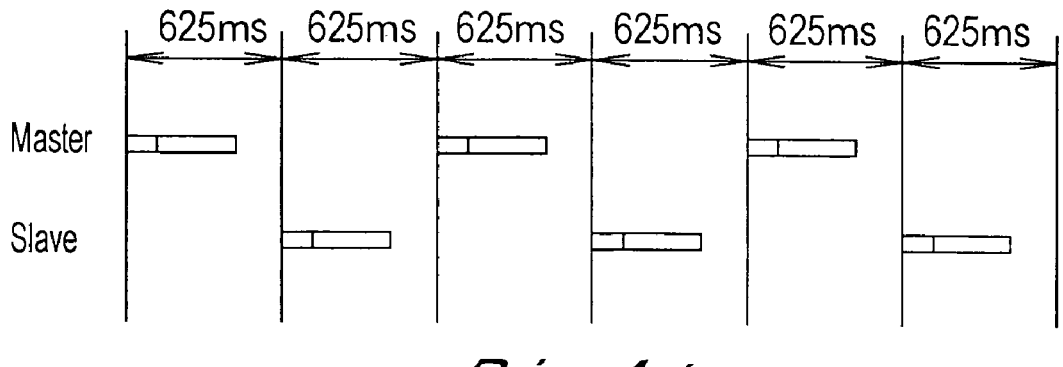
FIGS. 15(A), 15(B) and 15(C) are conceptual diagrams for explaining an audio data communication method, respectively.
Figure 15B:
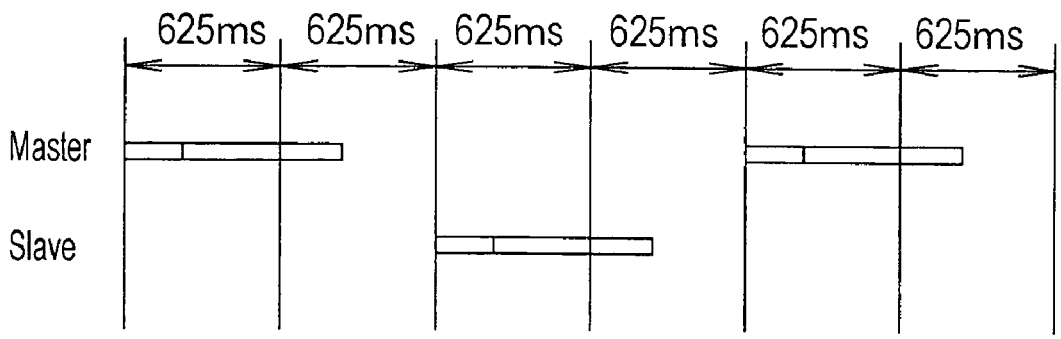
Figure 15C:
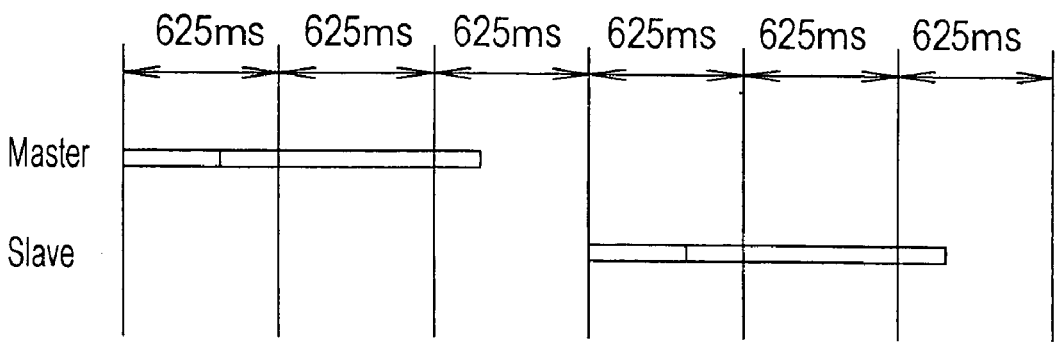
Figure 16:
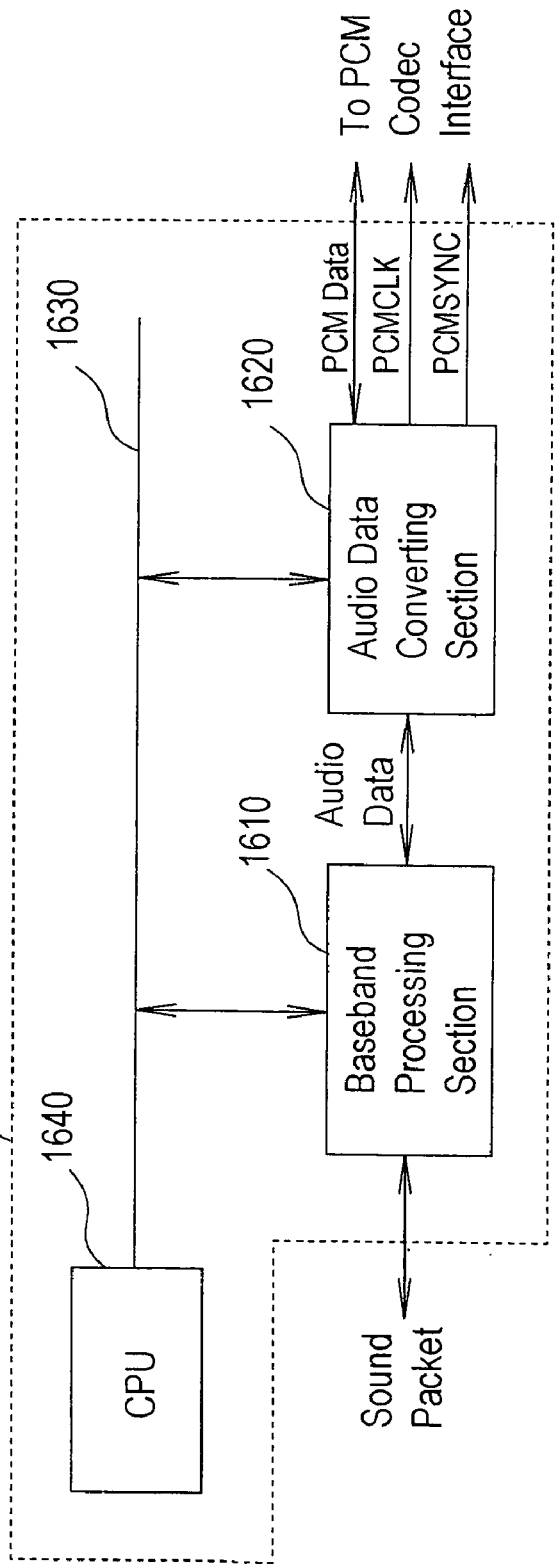
FIG. 16 is a block diagram showing the internal structure of a conventional audio data processing circuit.
Figure 17:
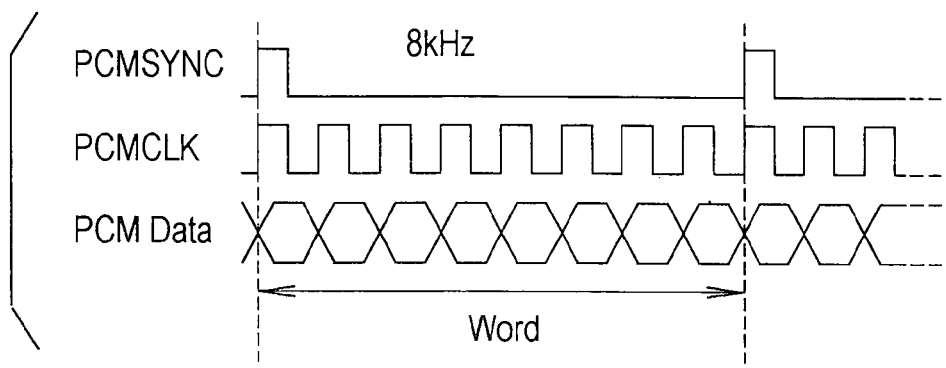
FIG. 17 is a timing chart showing the operation of a conventional audio data processing circuit.
Figure 18:
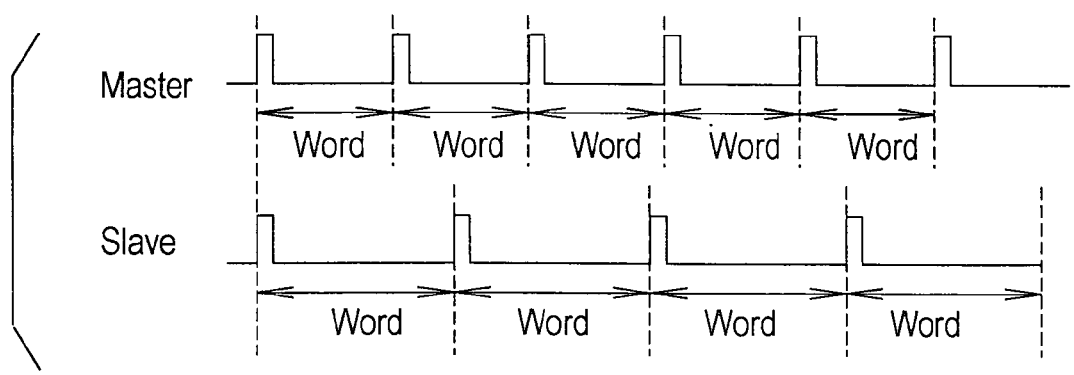
FIG. 18 is a timing chart showing the operation of a conventional audio data processing circuit.

Each time that a sync word of a received packet (see FIG. 14) is detected, the baseband processing section 110 extracts the payload section from that received packet and sends it to the audio data converting section 120. Furthermore, the baseband processing section 110 generates a transmission packet by using the audio data received from the audio data converting section 120. The baseband processing section 110 is also provided with a synchronization signal generating section 111. The synchronization signal generating section 111 generates a packet synchronization signal PSYNC which is synchronized with the cycle at which the sync words of the received packets are detected.

Upon receiving a packet, the audio data converting section 120 converts the audio data received from the baseband processing section 110, as necessary, and transfers it to the interface control section 130. Moreover, upon transmitting a packet, the audio data converting section 120 reconverts the audio data received from the interface control section 130, as necessary, and transfers it to the baseband processing section 110. The data formats which can be converted and reconverted by the audio data converting section 120 are, for example, the same as those used in a conventional audio data processing circuit.

The interface control section 130 then generates a transfer clock PCMCLK and a transfer synchronization signal PCMSYNC, by using the packet synchronization signal PSYNC input from the synchronization signal generating section 111. The transfer clock PCMCLK and the transfer synchronization signal PCMSYNC are transmitted to a PCM codec interface circuit (not illustrated). Furthermore, the interface control section 130 sends and receives audio data (PCM data), to and from the PCM codec interface circuit. The PCM codec interface circuit uses the transfer clock PCM-CLK and the transfer synchronization signal PCMSYNC for both transmitting and receiving packets.

The synchronization correction circuit according to this embodiment comprises the synchronization signal generating section 111 and the interface control section 130.

Figure 2:
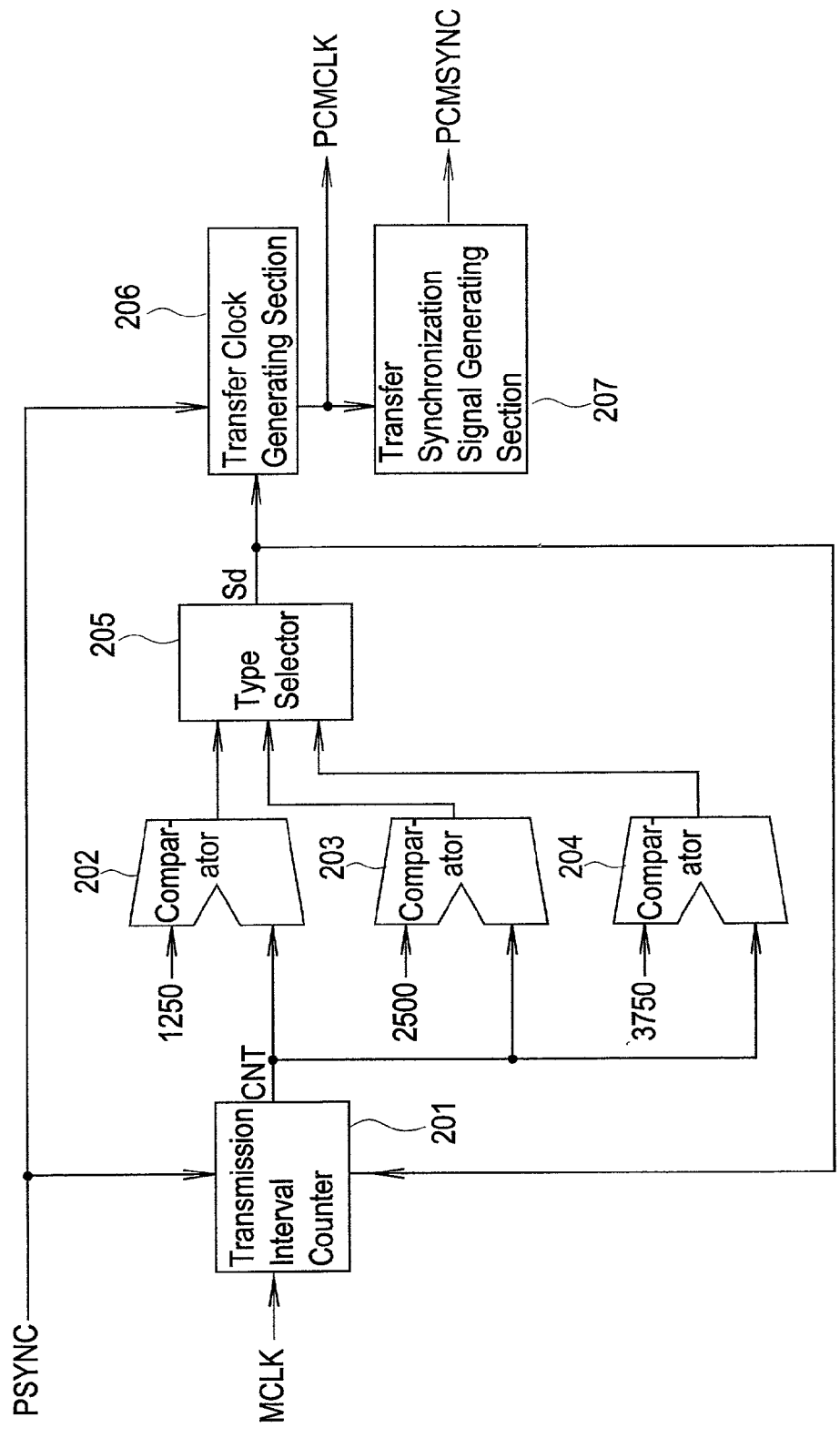
FIG. 2 is a circuit diagram showing the internal structure of the interface control section shown in FIG. 1.

FIG. 2 is a block diagram showing the constituent elements of an interface control section 130. The interface control section 130 shown in FIG. 2 comprises a transmission interval counter 201, three comparators 202, 203, 204, a type selector 205, a transfer clock generating section 206, and a transfer synchronization signal generating section 207.

The transmission interval counter 201 counts the clock number of a measurement clock MCLK, and outputs the count value CNT. The transmission interval counter 201 halts the count when a detection signal Sd has a High level, and it resets the count value when the packet synchronization signal PSYNC is input. In this embodiment, the measurement clock has a frequency of 1 MHz.

Comparator 202 inputs the count value CNT to one input terminal, and inputs the numerical value "1250" (corresponding to the packet interval for type I, in other words, 1250 μs) to the other input terminal. If the two inputs are not matching, it outputs a low-level signal, and if the two inputs are matching, then it outputs a high-level signal. Similarly, the comparator 203 inputs a count value CNT via one input terminal and inputs the numerical value "2500" (corresponding to the packet interval for type II) via the other input terminal; and it outputs a high-level signal only when the two input values are matching. The comparator 204 inputs the count value CNT via one input terminal and inputs a numerical value "3750" (corresponding to the packet interval for type III) via the other input terminal; and it outputs a high-level signal only when the two input values are matching.

The type selector 205 selects the output signal from one of comparator 202, 203 or 204. The comparator selected by the type selector 205 is determined by control implemented by the CPU 150, or the like, in accordance with the type of packet (type I, II or III) used in communication. The type of packet used in communication is conveyed from the master to the slave, and input to the CPU 150, for example.

The transfer clock generating section 206 generates a transfer clock PCMCLK in synchronization with the input timing of the packet synchronization signal PSYNC, and outputs the transfer clock PCMCLK to a latter-stage PCM codec interface circuit (not illustrated). If, for example, one packet consists of 8 bits×10 words, then a transfer clock PCMCLK having a cycle of 1/80 of the packet synchronization signal PSYNC is generated. When the next packet synchronization signal PSYNC is input, the transfer clock generating section 206 resets the clock generation function and starts to generate a transfer clock PCMCLK that is synchronized with the new packet synchronization signal PSYNC. Furthermore, if the type selector 205 output is high-level, then the transfer clock generating section 206 fixes the transfer clock PCMCLK to low-level.

The transfer synchronization signal generating section 207 generates a transfer synchronization signal PCMSYNC from the transfer clock PCMCLK, and then outputs it to the latter-stage PCM codec interface circuit. For example, if one word consists of 8 bits, then the transfer synchronization signal generating section 207 will generate and output one transfer synchronization signal PCMSYNC, each time that 8 transfer clocks PCMCLK have been input.

Next, the operation of the synchronization correction circuit according to this embodiment will be described with reference to FIG. 3 to FIG. 5.

When operating as a master device, the audio data processing circuit 100 does not use the synchronization correction circuit 111, 130 according to this embodiment. In other words, in an audio data processing circuit 100 operating as a master device, the synchronization signal generating section 111 does not generate a packet synchronization signal PSYNC. The transfer clock PCMCLK and the transfer synchronization signal PCMSYNC are generated in a similar manner to the prior art.

On the other hand, if the audio data processing circuit 100 is operating as a slave device, then a transfer clock PCM-CLK and a transfer synchronization signal PCMSYNC are generated by means of the synchronization correction circuit 111, 130. This is described below with reference to an example where the packet transmission and reception interval is 1250 μs.

Figure 3:
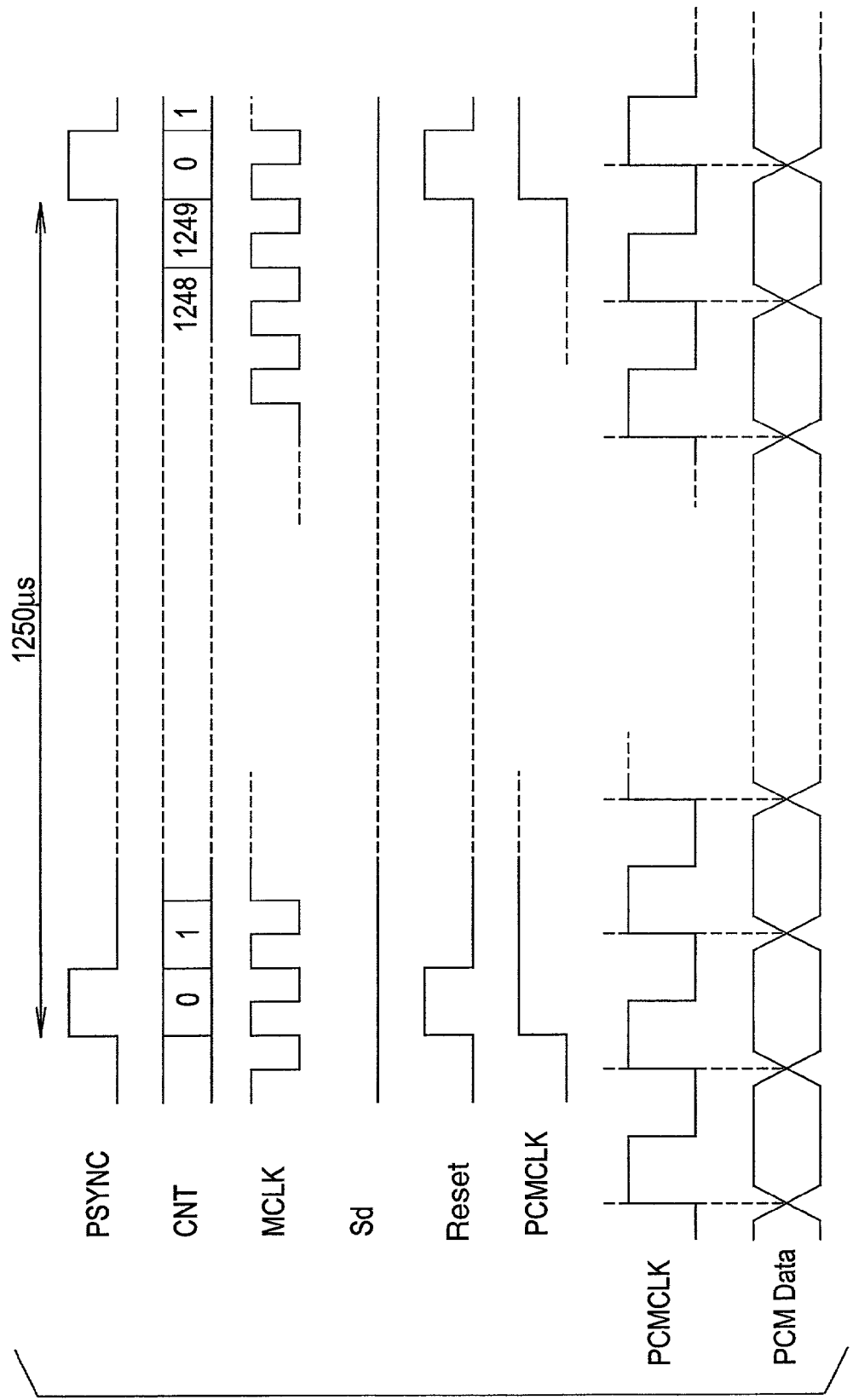
FIG. 3 is a timing chart illustrating the operation of a synchronization correction circuit according to a first embodiment of the present invention.

FIG. 3 is a timing chart illustrating the operation of an interface control section 130 in a case where the master and slave have matching operating frequencies.

The transmission interval counter 201 is reset at the rise timing of the packet synchronization signal PSYNC and starts a new count of the measurement clock MCLK. The count value CNT is sent successively to the comparators 202, 203 and 204.

As described above, comparators 202, 203 and 204 compare these count values CNT with a set value of 1250, 2500 or 3750. If the count value CNT has not yet reached the set value, then the output of the respective comparators 202, 203, 204 is set to low-level.

The type selector 205 selects the output of comparator 202 and transmits this output to the transfer clock generating section 206.

This transfer clock generating section 206 generates and outputs a transfer clock PCMCLK of a prescribed cycle, when the input from the type selector 205 is low-level.

Also, in this case, the transfer synchronization signal generating section 207 outputs a transfer synchronization signal PCMSYNC, each time the clock number of the transfer clock PCMCLK reaches the number of bits in one word.

In the example in FIG. 3, the operating frequencies of the master and slave are matching, and therefore, when the count value CNT of the transmission interval counter 201 has reached "1249" (in other words, the clock number of the measurement clock MCLK has reached 1250), the next packet synchronization signal PSYNC is input to the transmission interval counter 201. Thereby, the count value CNT of the transmission interval counter 201 is reset. The transmission interval counter 201 restarts a count from "0".

Thereafter, the interface control section 130 repeats the generation and output of the transfer clock PCMCLK and the transfer synchronization signal PCMSYNC, in a similar manner.

Figure 4:
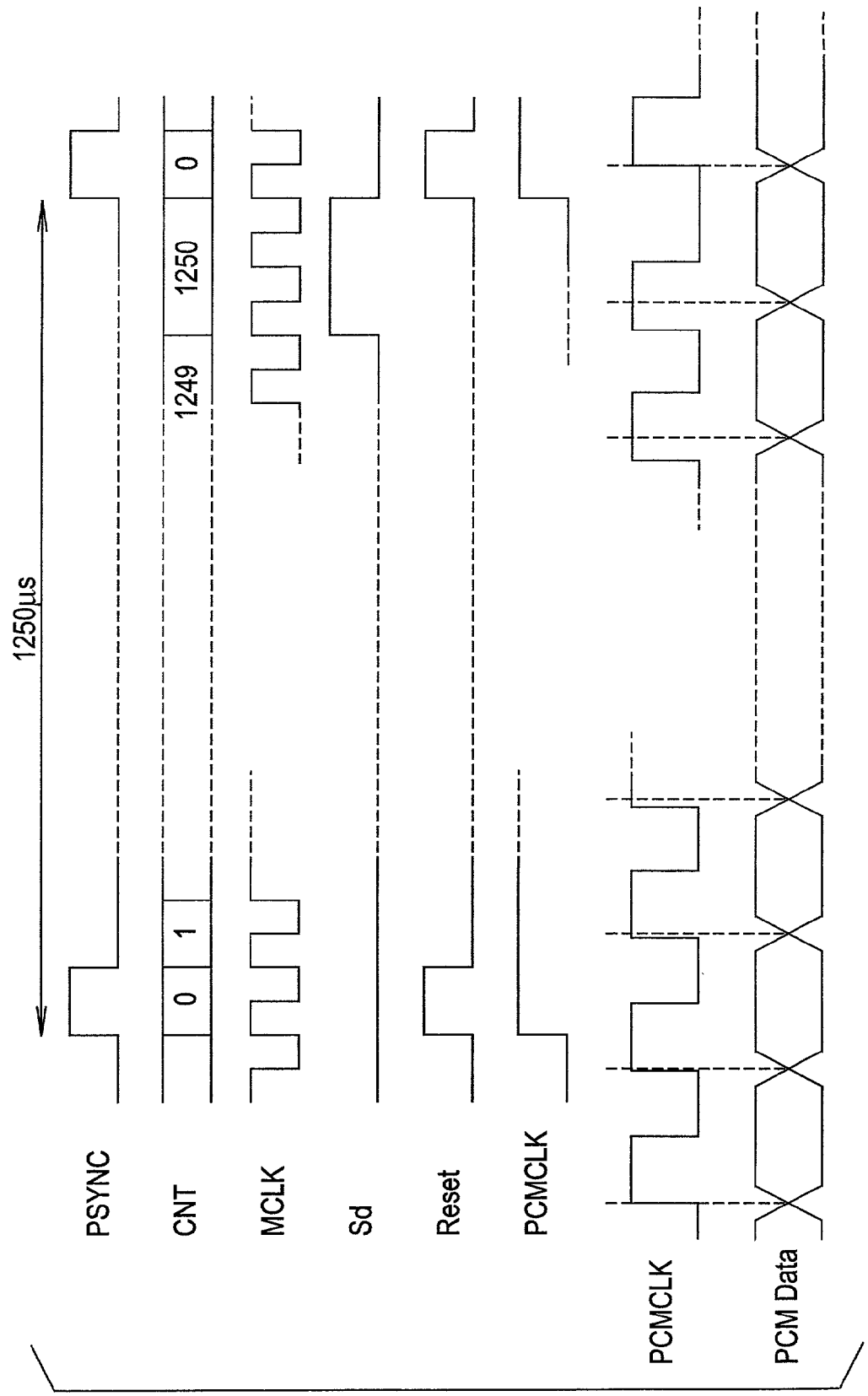
FIG. 4 is a timing chart illustrating the operation of a synchronization correction circuit according to a first embodiment of the present invention.

FIG. 4 is a timing chart illustrating the operation of an interface control section 130 in a case where the operating frequency of the slave is higher than the operating frequency of the master.

The operation immediately after the start of the count is the same as that illustrated in FIG. 3. In other words, the transmission interval counter 201 successively outputs the count value CNT of the measurement clock MCLK, the comparators 202, 203, 204 compare the count value CNT with the set value, and the type selector 205 selects the outputs of the comparator 202 and transmits this output to the transfer clock generating section 206. The transfer clock generating section 206 generates and outputs a transfer clock PCMCLK having a prescribed cycle, whilst the input from the type selector 205 is at low-level.

Here, whereas the measurement clock MCLK is synchronized to the system clock in the slave, the packet synchronization signal PSYNC is synchronized to the system block in the master. Therefore, if the operating frequency of the slave is higher than the operating frequency of the master, the count value CNT of the transmission interval counter 201 will reach "1250" before the next packet synchronization signal PSYNC is input. Thereby, the output of the comparator 202 will change to high-level, and hence the output Sd of the type selector 205 will also change to high-level. When the signal Sd changes to high-level in this manner, the transmission interval counter 201 halts the count. Thereby, the count value CNT remained unchanging at "1250". Furthermore, when the signal Sd assumes a high-level, the transfer clock generating section 206 fixes the transfer clock PCMCLK to a low-level.

Thereupon, when the next packet synchronization signal PSYNC is input, the count value of the transmission interval counter 201 is reset and the count value CNT becomes "0", whereby the signal Sd assumes a low level. Consequently, the transmission clock generating section 206 restarts generation of the transfer clock PCMCLK, in accordance with the input timing of the packet synchronization signal PSYNC.

In this way, if the operating frequency of the slave is greater than the operating frequency of the master, then the period of the transfer clock PCMCLK is corrected by lengthening the low-level period of the transfer clock PCMCLK corresponding to the final data element of the word. The transfer synchronization signal generating section 207 uses this transfer clock PCMCLK to generate a transfer synchronization signal PCMSYNC.

Thereafter, the interface control section 130 similarly repeats the operations of generating and outputting transfer clock PCMCLK and the transfer synchronization signal PCMSYNC.

Figure 5:
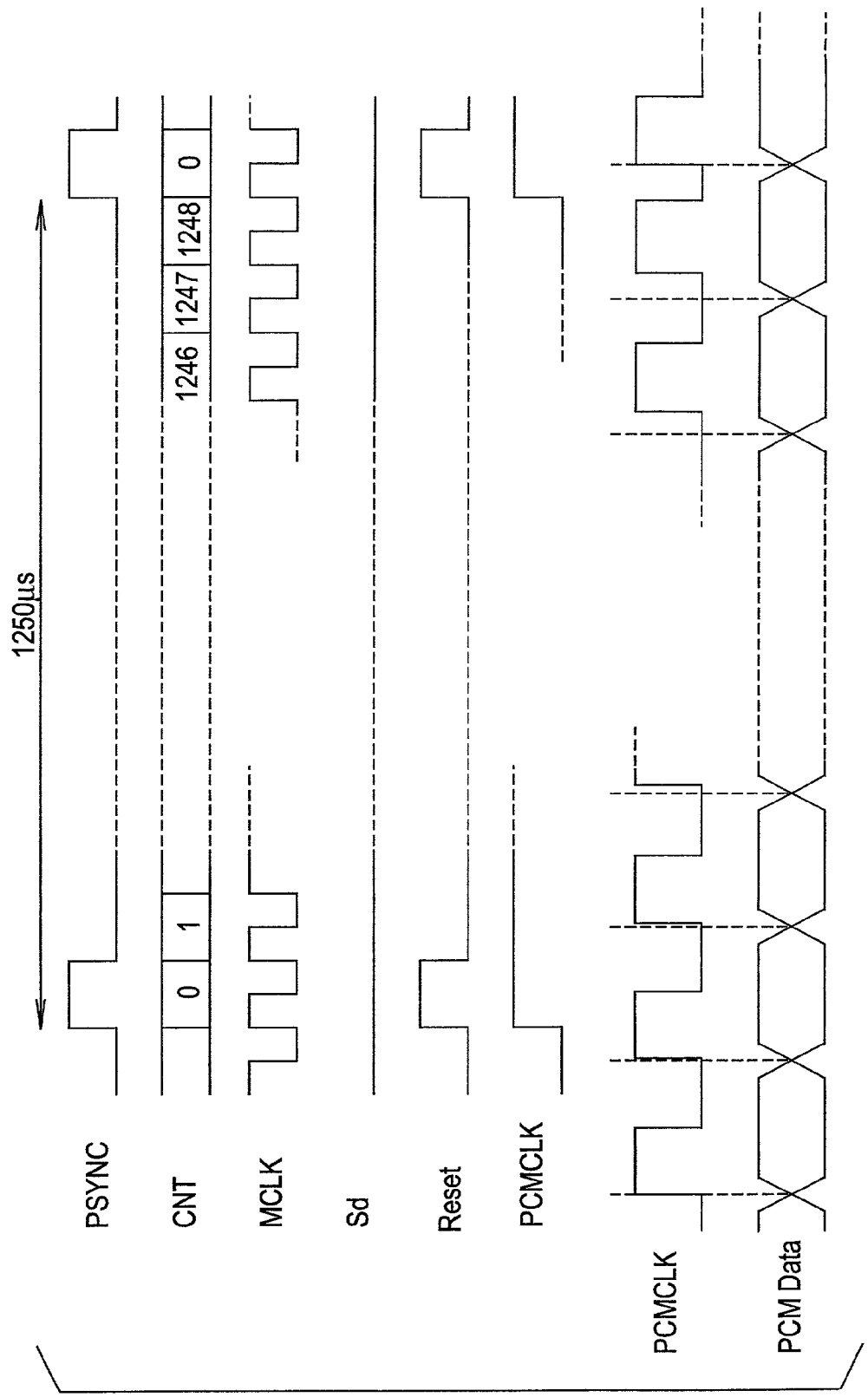
FIG. 5 is a timing chart illustrating the operation of a synchronization correction circuit according to a first embodiment of the present invention.

FIG. 5 is a timing chart illustrating the operation of the interface control section 130 in a case where the operating frequency of the slave device is lower than the operating frequency of the master device.

The operation immediately after the start of counting is similar to that illustrated in FIG. 3.

If the operating frequency of the slave is lower than the operating frequency of the master, then the subsequent packet synchronization signal PSYNC will be input before the count value CNT of the transmission interval counter 201 reaches "1249" (in other words, before 1250 µs has passed since the input of the packet synchronization signal PSYNC). In this case, in the transfer clock generating section 206, the transfer clock PCMCLK will be raised to high-level, at the input timing of the new packet synchronization signal PSYNC.

If the operating frequency of the slave is lower than the operating frequency of the master in this way, then the cycle of the transfer clock PCMCLK is corrected by shortening the low-level period of the transfer clock PCMCLK corresponding to the last data element of the word. Thereafter, the transfer synchronization signal generating section 207 uses this transfer clock PCMCLK to generate a transfer synchronization signal PCMSYNC.

Thereupon, the interface control section 130 repeats the generation and output of the transfer clock PCMCLK and transfer synchronization signal PCMSYNC, in a similar manner.

As described previously, according to the synchronization correction circuit relating to this embodiment, the period of the transfer clock PCMCLK and the transfer synchronization signal can be corrected in such a manner that they are synchronized with the cycle of the packet synchronization signal PSYNC, in other words, the reception cycle for packets from the master. Therefore, according to this embodiment, it is possible to improve the quality of audio data communicated by a Bluetooth system.

Second Embodiment

Next, a synchronization correction circuit according a second embodiment of the present invention will hereinafter be described with reference to FIG. 6 and FIG. 7.

Figure 6:
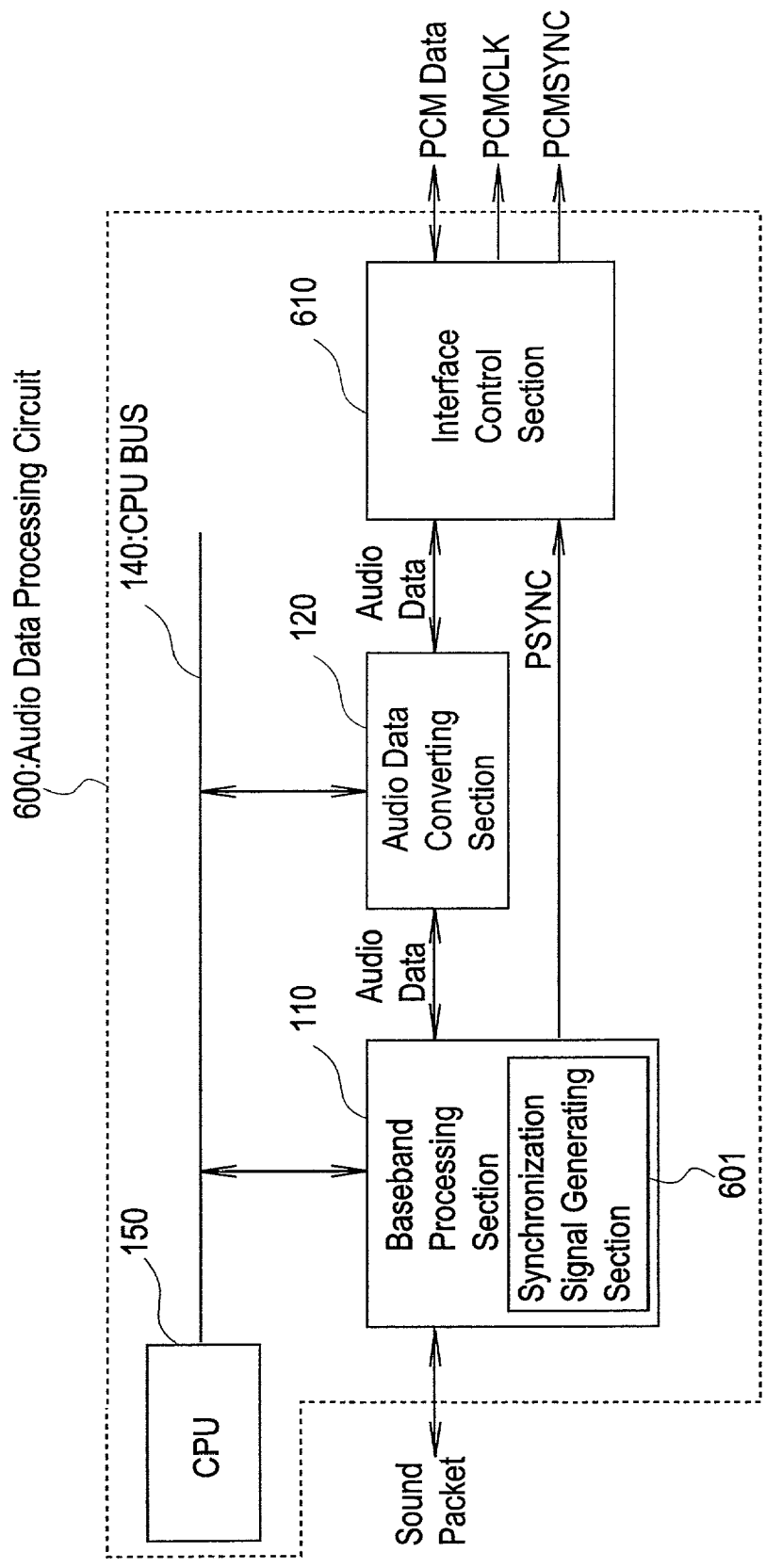
FIG. 6 is a block diagram showing the composition of a synchronization correction circuit according to a second embodiment of the present invention.

FIG. 6 is a block diagram showing the composition of an audio data processing circuit according to this embodiment. In this diagram, the constituent elements labelled with the same numerals as FIG. 1 indicate elements which are the same as those shown in FIG. 1. In the audio data processing circuit 600 according to this embodiment, the composition of the synchronization signal generating section 601 provided inside the baseband processing section 110, and the composition of the interface control section 610 are different to the audio data processing circuit 100 according to the first embodiment.

Similarly to the first embodiment, the synchronization signal generating section 601 generates a packet synchronization signal PSYNC using the cycle at which received packet sync words are detected. However, in this embodiment, rather than generating a packet synchronization signal PSYNC by synchronizing with the reception cycle for one packet, a packet synchronization signal PSYNC is generated every 7500 µs. Here, 7500 µs is the smallest common multiple of 1250 µs, 2500 µs and 3750 µs, which are the transmission intervals of packet transmission types I, II and III. In other words, in this embodiment, if the communicated packets are type I (packet transmission cycle of 1250 µs), then a packet synchronization signal PSYNC is generated in synchronization with the each reception cycle of 6 packets; if the communicated packets are type II (packet transmission cycle of 2500 µs), then a packet synchronization signal PSYNC is generated in synchronization with each reception cycle of 3 packets; and if the communicated packets are type III (packet transmission cycle of 3750 µs), then a packet synchronization signal PSYNC is generated in synchronization with each reception cycle of 2 packets.

Similarly to the interface control section 130 according to the first embodiment, the interface control section 610 uses the packet synchronization signal PSYNC to generate a transfer clock PCMCLK and a transfer synchronization signal PCMSYNC, which are transferred to the latter-stage PCM codec interface circuit (not illustrated). As described hereinafter, the interface control section 610 according to this embodiment differs from the interface control section 130 according to the first embodiment in that it comprises only one comparator.

The synchronization correction circuit according to the present embodiment comprises the synchronization signal generating section 601 and the interface control section 610.

Figure 7:
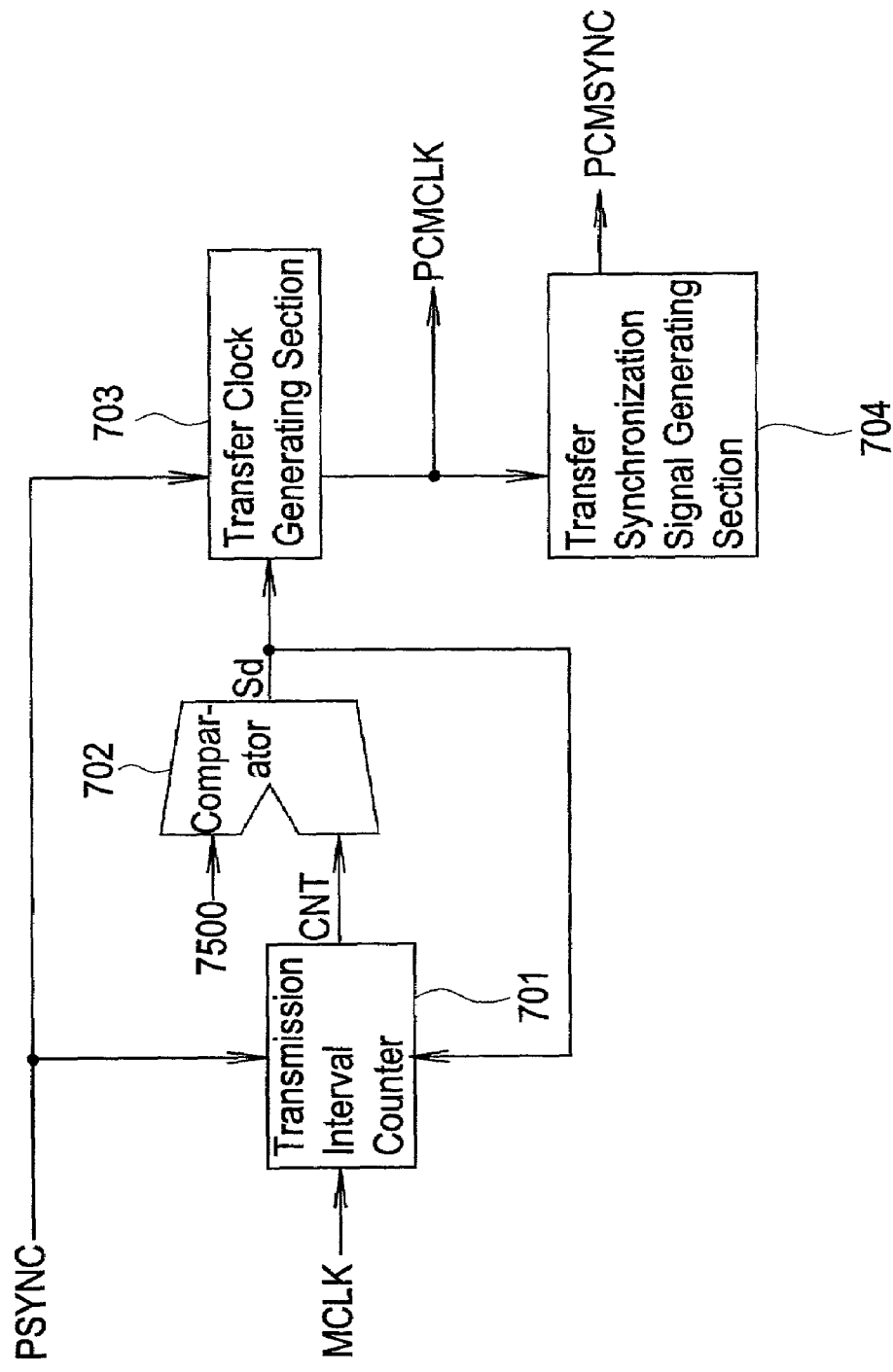
FIG. 7 is a circuit diagram showing the internal structure of the interface control section shown in FIG. 6.

FIG. 7 is a block diagram showing the constituent elements of the interface control section 610. The interface control section 610 in FIG. 7 comprises a transmission interval counter 701, comparator 702, transfer clock generating section 703 and transfer synchronization signal generating section 704.

Similarly to the transmission interval counter 201 according to the first embodiment, the transmission interval counter 701 counts the clock number of the measurement clock MCLK (for example, 1 MHz) and outputs a count value CNT, whilst the detection signal Sd is low-level. Moreover, the transmission interval counter 701 halts the count if the detection signal Sd is high-level, and it resets the count value if the packet synchronization signal PSYNC is input.

The comparator 702 inputs the count value CNT via one input terminal and inputs the numerical value "7500" via the other input terminal. Thereupon, if the two input values are not matching, then a low-level signal is output, and if the two input values are matching, then it outputs a high-level signal.

Similarly to the transfer clock generating section 206 according to the first embodiment, the transfer clock generating section 703 generates a transfer clock PCMCLK in synchronization with the input timing of the packet synchronization signal PSYNC, and when the next packet synchronization signal PSYNC is input, it reset the clock generation operation and starts generation of a transfer clock PCMCLK that is synchronized with the new packet synchronization signal PSYNC, and furthermore, if the signal Sd is high-level, then it fixes the transfer clock PCMCLK to low-level.

Similarly to the transfer synchronization signal generating section 207 according to the first embodiment, the transfer synchronization signal generating section 704 generates and outputs a transfer synchronization signal PCMSYNC from the transfer clock PCMCLK.

As described above, by means of the synchronization correction circuit 601, 610 according to this embodiment, the clock width of the transfer clock PCMCLK is corrected every 7500 μs. In other words, if the communicated packets are type I, then synchronization correction is carried out at a ratio of once for every 6 packets' equivalent of the transfer clock PCMCLK. Moreover, if the communicated packets are type II, then synchronization correction is carried out at a ratio of once for every three packets' equivalent of the transfer clock PCMCLK. Similarly, if the communicated packets are type III, then synchronization correction is carried out at a ratio of once for every two packets' equivalent of the transfer clock PCMCLK. If the divergence in synchronization between the master and slave devices is very small, then even if synchronization correction is carried out at cycles of the above order, it is still possible to obtain synchronization of sufficiently high accuracy.

As described above, according to the synchronization correction circuit relating to this embodiment, it is possible to correct the cycle transfer clock PCMCLK and the transfer synchronization signal PCMSYNC in such a manner that they are synchronized with the cycle of the packet synchronization signal PSYNC, in other words, the reception cycle of packets from the master device. Consequently, according to this embodiment, it is possible to improve the quality of audio data communicated by a Bluetooth system.

Moreover, since the synchronization correction circuit according to this embodiment has one comparator and does not require a type selector, the scale of the circuitry is smaller than the synchronization correction circuit according to the first embodiment, and hence power consumption is lower.

Third Embodiment

Next, a synchronization correction circuit according to a third embodiment of the present invention will hereinafter be described with reference to FIG. 8 and FIG. 9.

Figure 8:
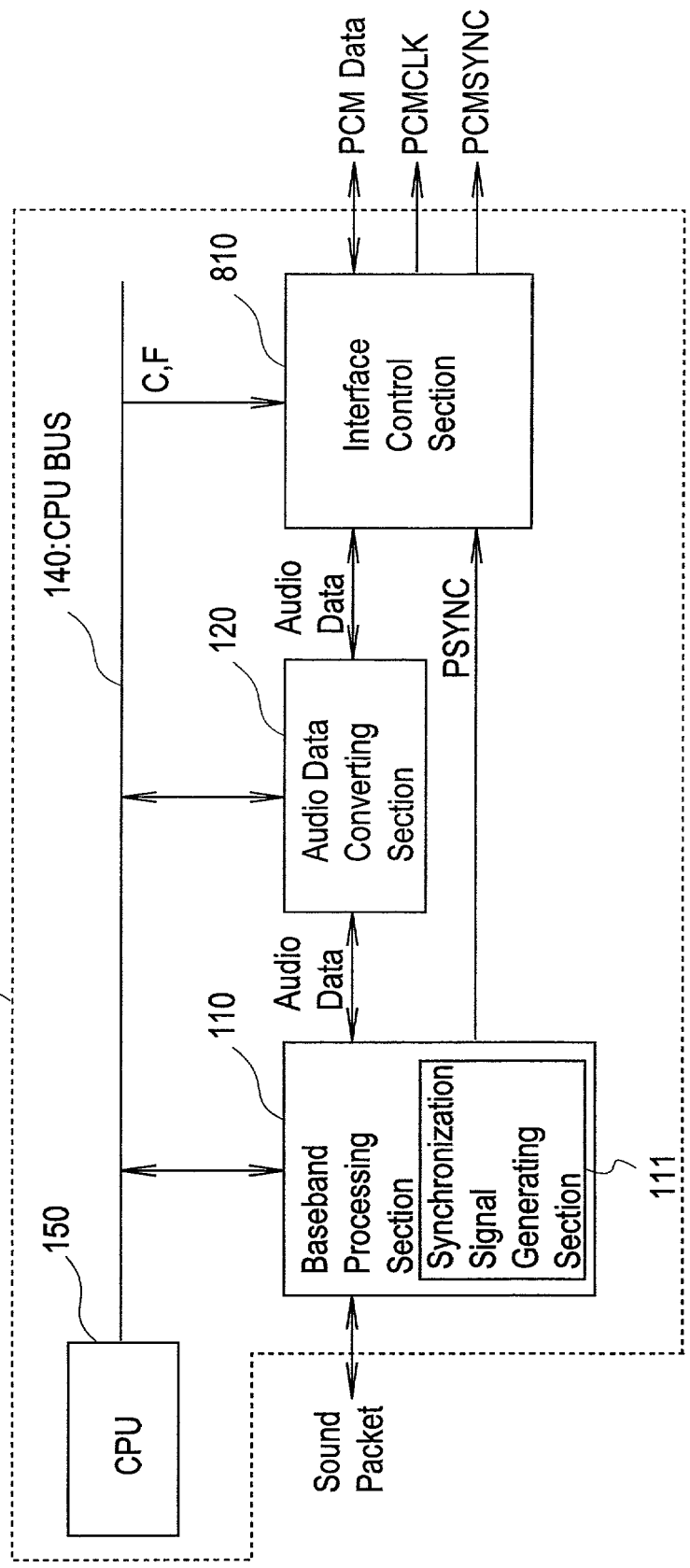
FIG. 8 is a block diagram showing the composition of a synchronization correction circuit according to a third embodiment of the present invention.

FIG. 8 is a block diagram showing the composition of an audio data processing circuit according to this embodiment. In FIG. 8, the constituent elements labelled with the same numerals as FIG. 1 indicate the same elements as those shown in FIG. 1. In the audio data processing circuit 800 according to this embodiment, the composition of the interface control section 810 differs from that of the audio data processing circuit 100 according to the first embodiment.

The interface control section 810 uses the packet synchronization signal PSYNC to generate a transfer clock PCMCLK and a transfer synchronization signal PCM-SYNC. The interface control section 810 according to this embodiment inputs a comparison value C and a number of stages F from the CPU 150. Here, the comparison value C is the packet transmission interval designated by the master device, and in the case of type I, this is "1250", in the case of type II, it is "2500", and in the case of type III, it is "3750". The number of stages F is a value indicating the frequency at which synchronization correction is implemented. In other words, the interface control section 810 according to this embodiment performs synchronization correction each time F packet synchronization signals PSYNC are input.

The synchronization correction circuit according to this embodiment comprises the synchronization signal generating section 111 and the interface control section 810.

Figure 9:
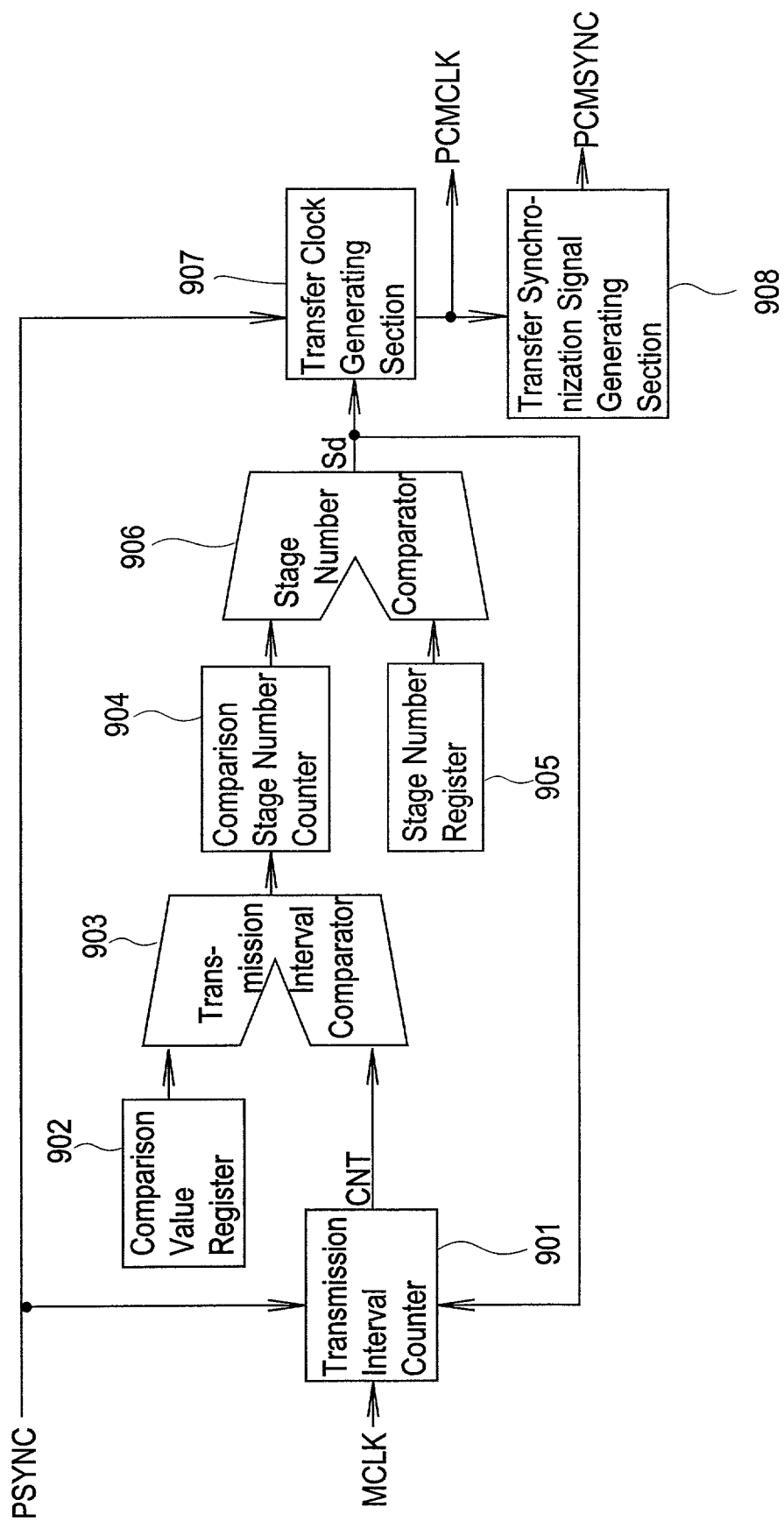
FIG. 9 is a circuit diagram showing the internal structure of the interface control section shown in FIG. 8.

FIG. 9 is a block diagram showing the principal composition of the interface control section 810. The interface control section 810 shown in FIG. 9 comprises a transmission interval counter 901, a comparison value register 902, a transmission interval comparator 903, a comparison stage number counter 904, a stage number register 905, a stage number comparator 906, a transfer clock generating section 907, and a transfer synchronization signal generating section 908.

The transmission interval counter 901 counts the clock number of the measurement clock MCLK (for example, 1 MHz) and outputs a count value CNT; when the detection signal Sd is high-level, it halts the count, and when the packet synchronization signal PSYNC is input, it resets the count value.

The comparison value register 902 holds a comparison value C input from the CPU 150.

The comparator 903 inputs a count value CNT via one input terminal, and inputs the stored value in the comparison value register (in other words, comparison value C) to the other. If the two input values are not matching, it outputs a low-level signal, and if the tow input values are matching, then it outputs a high-level signal.

The comparison stage number counter 904 counts the number of times that the output of the comparator 903 has risen from low-level to high-level, in other words, the number of times that the count value CNT has reached the comparison value C.

The stage number register 905 holds a number of stages F input from the CPU 150.

The stage number comparator 906 inputs the output value of the comparison stage number counter 904 and the stored value in the stage number counter 904, in other words, the number of stages F. If the two input values are not matching, then it outputs a low-level signal, and if the two input values are matching, then it outputs a high-level signal. The output value of the stage number comparator 906 is transmitted as a detection signal Sd to the transfer clock generating section 907 and the transmission interval counter 901.

Similarly to the transfer clock generating section 206 according to the first embodiment, the transfer clock generating section 907 generates a transfer clock PCMCLK in synchronization with the input timing of the packet synchronization signal PSYNC, and when the next packet synchronization signal PSYNC is input, it resets the clock generation function and starts generation of a transfer clock PCMCLK which is synchronized with the new packet synchronization signal PSYNC, in addition to which, it fixes the transfer clock PCMCLK to low-level when the signal Sd is high-level.

Similarly to the transfer synchronization signal generating section 207 according to the first embodiment, the transfer synchronization signal generating section 908 generates a transfer synchronization signal PCMSYNC from the transfer clock PCMCLK and outputs same to the PCM codec interface circuit.

Next, the operation of the synchronization correction circuit according to this embodiment will be described.

Firstly, a comparison value C and stage number F are input from the CPU 150 as initial settings of the audio data processing circuit 800, and are stored in the registers 902, 905.

Thereupon, the transmission interval counter 901 starts a count. The transmission interval counter 901 is reset at the rise timing of the packet synchronization signal PSYNC, and starts a new count of the measurement clock MCLK. The count value CNT is transmitted to the transmission interval comparator 903.

The transmission interval comparator 903 compares the count value CNT with the comparison value C. If the count value CNT has not reached the comparison value, then the output of the comparator 903 is low-level.

When the count value CNT reaches the comparison value C, the output of the comparator changes to high-level, and the count value of the comparison stage number counter 904 is incremented by '1'. The stage number comparator 906 compares the count value of the comparison stage number counter 904 with the stage number F. If the count value has reached the stage number F, then the stage number comparator 906 sets the signal Sd to high-level.

Similarly to the first embodiment, the transmission interval counter 901 halts the count operation whilst the signal Sd is at high-level. The transmission interval counter 901 resets the count value CNT, when the next packet synchronization signal PSYNC is input. Moreover, in this case, the comparison stage number counter 904 is also reset.

Similarly to the first embodiment, if the operating frequency of the slave is higher than the operating frequency of the master, then the output of the comparator 903 will change to high-level, before the next packet synchronization signal PSYNC is input. Therefore, in this case, the output signal Sd of the stage number comparator 906 assumes a high-level at each F input cycles of the packet synchronization signal PSYNC. The transfer clock generating section 907 corrects the low-level period of the transfer clock PCMCLK, each time that the signal Sd becomes high-level.

On the other hand, if the operating frequency of the slave is lower than the operating frequency of the master, then the signal Sd will never assume high-level. In this case, similarly to the first embodiment, the transfer clock generating section 907 corrects the clock width of the transfer clock, each time the packet synchronization signal PSYNC is input (in other words, at a rate of once every C $\mu$s).

As described above, according to the synchronization correction circuit relating to this embodiment, the cycles of the transfer clock PCMCLK and the transfer synchronization signal PCMSYNC can be corrected in such a manner that they are synchronized with the cycle of the packet synchronization signal PSYNC, in other words, the reception cycle of packets from the master device. Consequently, according to this embodiment, it is possible to improve the quality of audio data communications by a Bluetooth system.

Moreover, since the synchronization correction circuit according to this embodiment comprises two comparators, it has lower power consumption than the synchronization correction circuit according to the first embodiment.

On the other hand, the frequency with which divergence in synchronization is corrected can be set freely, and therefore, the range of synchronization divergence that can be corrected is greater than that afforded by the synchronization correction circuit according to the second embodiment.

Fourth Embodiment

Next, a synchronization correction circuit according to a fourth embodiment of the present invention will hereinafter be described with reference to FIG. 10 and FIG. 11.

Figure 10:
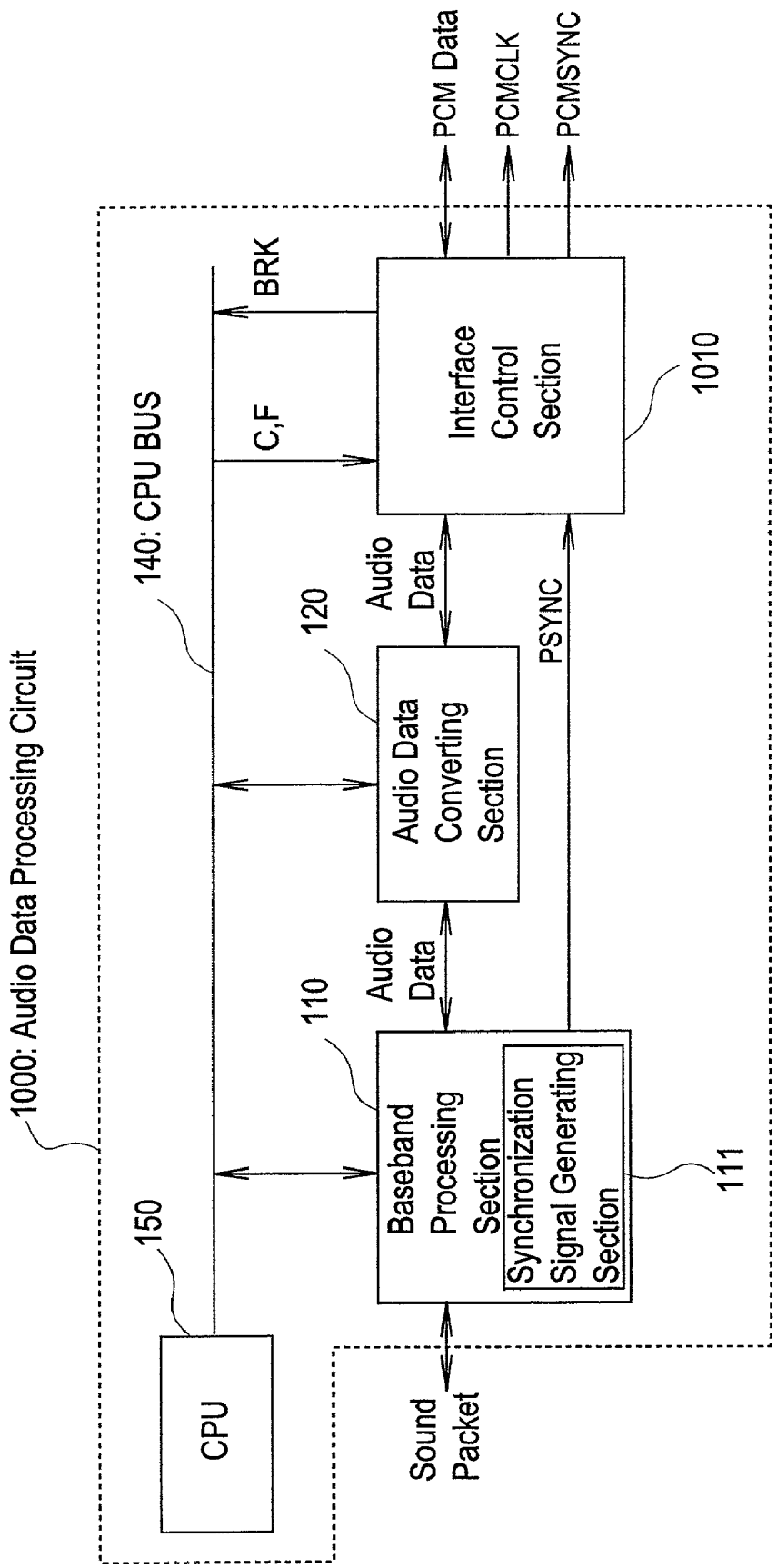
FIG. 10 is a block diagram showing the composition of a synchronization correction circuit according to a fourth embodiment of the present invention.

FIG. 10 is a block diagram showing the composition of an audio data processing circuit according to this embodiment. In FIG. 10, the constituent elements having the same labels as those of FIG. 8 indicate elements that are the same as those shown in FIG. 8.

The audio data processing circuit 1000 according to this embodiment differs from the audio data processing circuit 800 according to the third embodiment in that the interface control section 1010 generates and outputs an interrupt signal BRK. The interrupt signal BRK is output each time that correction of the transfer clock PCMCLK is implemented, when the operating frequency of the slave is higher than the operating frequency of the master. This interrupt signal BRK is sent via the bus 140 to the CPU 150.

Figure 11:
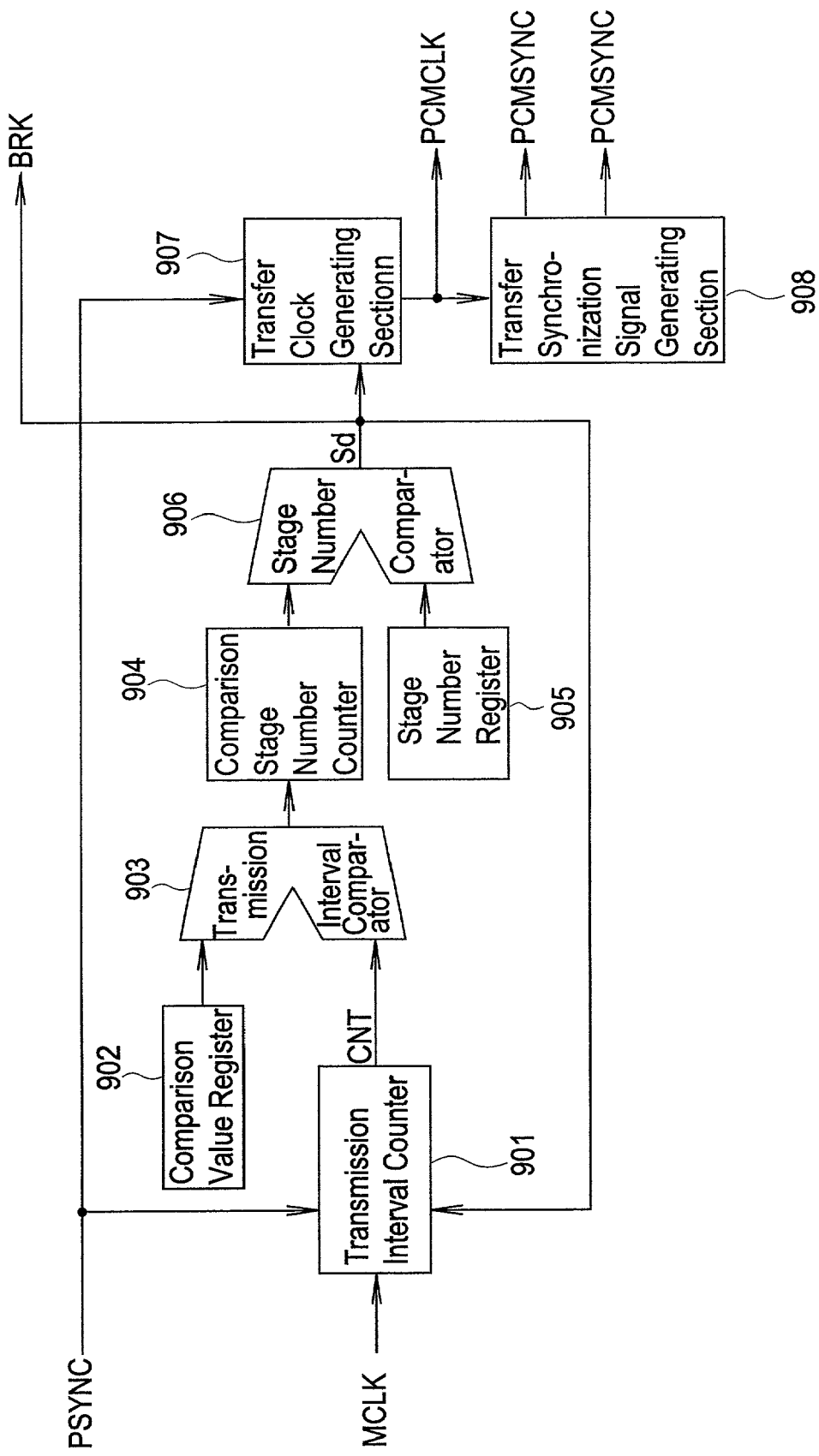
FIG. 11 is a circuit diagram showing the internal structure of the interface control section shown in FIG. 10.

FIG. 11 is a block diagram showing the principal composition of the interface control section 1010. In FIG. 11, constituent elements having the same labels as those of FIG. 9 indicate elements which are the same as those shown in FIG. 9. In other words, the internal structure of the interface control section 1010 according to this embodiment is the same as the interface control section 810 shown in FIG. 9, with the exception that it comprises a structure for outputting the output from the stage number comparator 906 to the bus 140 as an interrupt signal BRK.

According to this composition, the CPU 150 is able to detect that the operating frequency of the slave is higher than the operating frequency of the master, by means of receiving the interrupt signal BRK. If, on the other hand, the interrupt signal BRK is not received, then the CPU 150 can detect that the operating frequency of the slave is either equal to the operating frequency of the master, or lower than the operating frequency of the master. Thereby, the CPU 150 is able to adjust the operating frequency of the system clock, by means of the interrupt signal BRK, for example.

In other words, the synchronization correction circuit according to the present embodiment is able to perform synchronization correction by correcting the cycle of the system clock, in addition to performing synchronization correction similar to that in the third embodiment. Therefore, according to this embodiment, it is possible to correct the cycles of the transfer clock PCMCLK and the transfer synchronization signal PCMSYNC in a more accurate fashion.

Moreover, the operation of other circuits provided in the audio data processing circuit 1000 can also be corrected readily by correction of the system clock.

Fifth Embodiment

A fifth embodiment of the present invention will hereinafter be described below with reference to FIG. 12 and FIG. 13.

Figure 12:
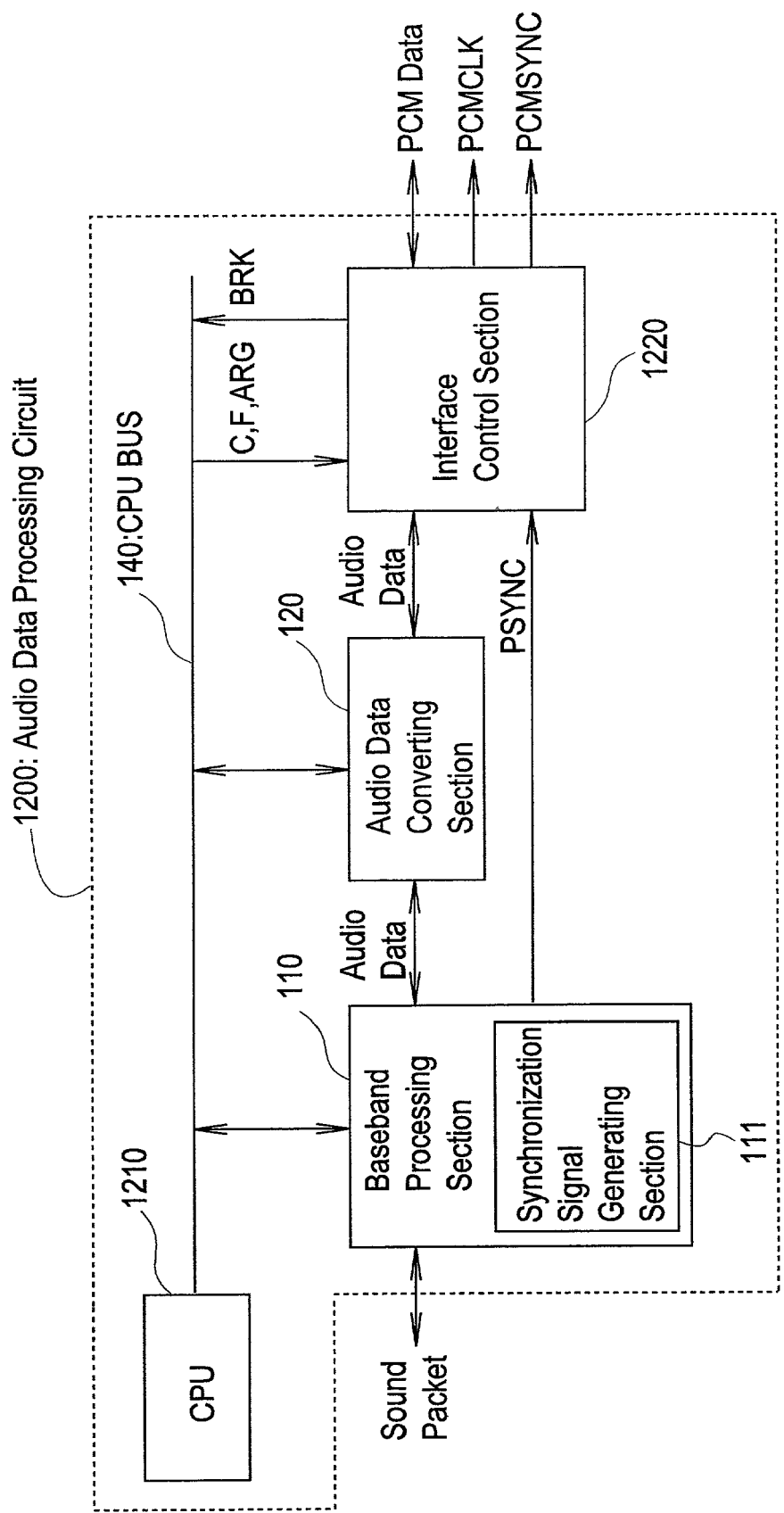
FIG. 12 is a block diagram showing the composition of a synchronization correction circuit according to a fifth embodiment of the present invention.

FIG. 12 is a block diagram showing the composition of an audio data processing circuit according to this embodiment. In FIG. 12, the constituent elements having the same labels as those of FIG. 10 indicate elements which are the same as those shown in FIG. 10.

Similarly to the fourth embodiment, the CPU 1210 successively inputs interrupt signals BRK from the interface control section 1220, and derives and outputs the average value ARG for the interval at which packets are transmitted by the master device, from the first prescribed number of interrupt signals BRK.

The interface control section 1220 internally stores the average value ARG input from the CPU 1210. The interface control section 1220 uses this average value ARG, in place of the comparison value C, in the subsequent synchronization correction process.

Figure 13:
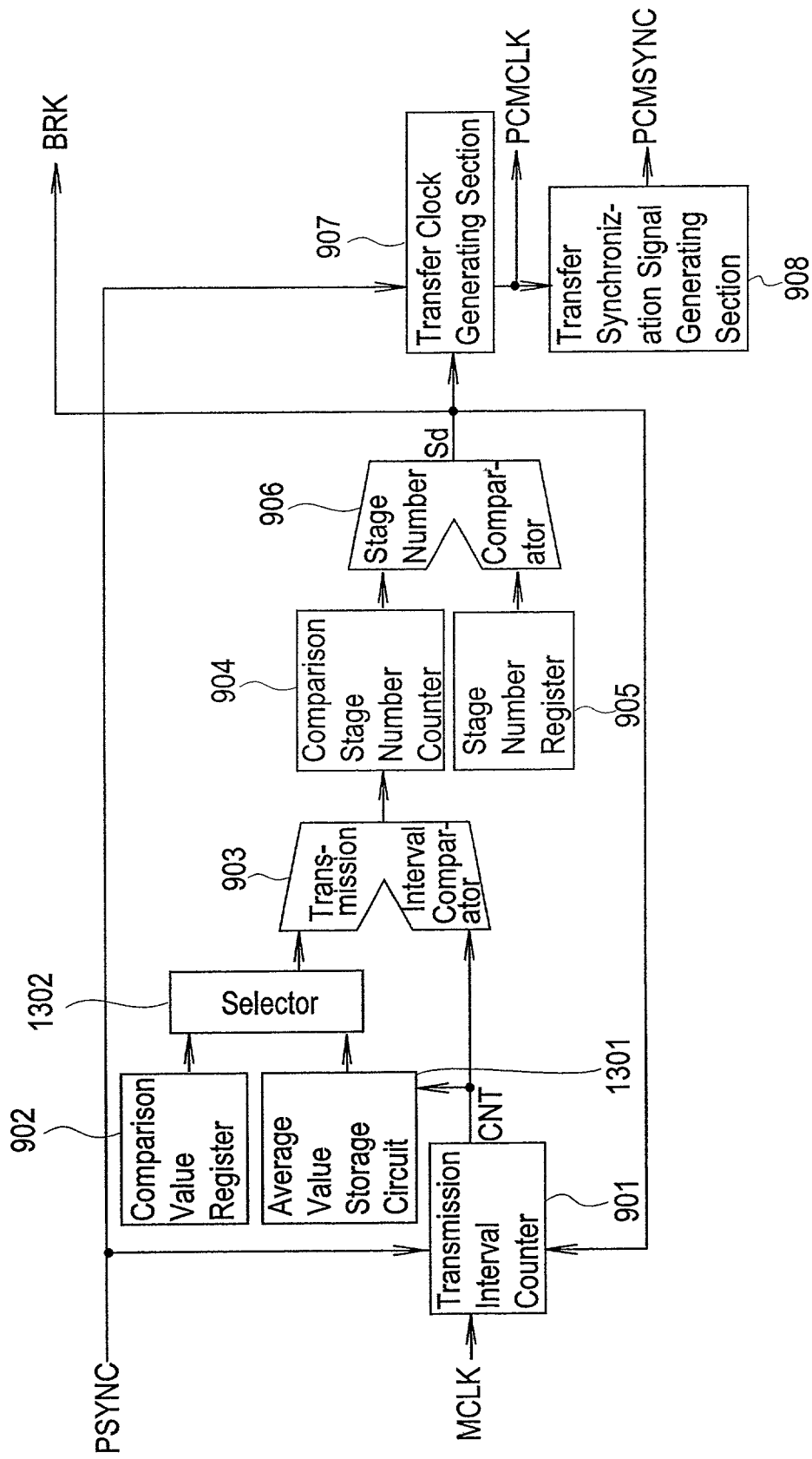
FIG. 13 is a circuit diagram showing the internal structure of the interface control section shown in FIG. 12.

FIG. 13 is a block diagram showing the principal composition of the interface control section 1220. In FIG. 13, the constituent elements having the same labels as those of FIG. 11 are elements which are the same as those shown in FIG. 11. In other words, the interface control section 1220 according to this embodiment differs from the interface control section 1010 in FIG. 11 in that it is provided with an average value storage circuit 1301 and a selector 1302.

The average value storage circuit 1301 stores the average value ARG input from the CPU 1210.

Before the average value ARG has been stored in the average value storage circuit 1301, the selector 1302 selects the output of the comparison value register 902 and transfers the comparison value C to the transmission interval comparator 903, and after the average value ARG has been stored in the average value storage circuit 1301, the selector 1302 selects the output of the average value storage circuit 1301 and transfers the average value ARG to the transmission interval comparator 903.

As illustrated in FIG. 13, it is also possible for the average value storage circuit 1301 to calculate the average value ARG by reading in the count value CNT of the transmission interval counter 901, in a successive fashion.

In this embodiment, firstly, a comparison value C and a stage number F are input from the CPU 1210 as initial settings of the audio data processing circuit 1200, and are stored in the registers 902, 905. When the count of the transmission interval counter 901 is started, the transmission interval comparator 903 successively compares the count values CNT and the comparison value C. Similarly to the third and fourth embodiments, the counting operation performed by the comparison stage number counter 904 and the comparison operation performed by the stage number comparator 906 are repeated. Moreover, also similarly to the third and fourth embodiments, the transmission clock generating section 907 generates a transfer clock PCMCLK which is corrected for synchronization. The transfer synchronization signal generating section 908 generates a transfer synchronization signal PCMSYNC from this transfer clock PCMCLK.

If the operating frequency of the slave is higher than the operating frequency of the master, then similarly to the third and fourth embodiments, the output signal Sd of the stage number comparator 906 will become high-level, at each F cycles of the packet synchronization signal PSYNC. This signal Sd is input to the CPU 1210 as an interrupt signal BRK.

As described previously, the CPU 1210 derives an average value ARG for the packet transmission interval from a prescribed number of interrupt signals BRK. The CPU 1210 sends this average value ARG to the interface control section 1220.

The interface control section 1220 stores the average value ARG input from the CPU 1210, in the average value storage circuit 1301. In this case, the selection made by the selector 1302 is switched to the average value storage circuit 1301, by control performed by the CPU 1210, or the like.

Thereupon, the transmission interval comparator 903 successively compared the count value CNT and the average value ARG, and if these values, CNT and ARG, are not matching, it outputs a low-level signal, whereas if they are matching, it outputs a high-level signal. The operation of the comparison stage number counter 904, stage number comparator 906, transfer clock generating section 907 and transfer synchronization signal generating section 908 are the same as their respective operations when using the comparison value C.

As described above, according to the synchronization correction circuit relating to this embodiment, it is possible to correct the cycles of the transfer clock PCMCLK and the transfer synchronization signal PCMSYNC, in such a manner that they are synchronized with the cycle of the packet synchronization signal PSYNC, in other words, the reception cycle of packets from the master. Therefore, according to this embodiment, it is possible to improve the quality of audio data communicated by a Bluetooth system.

Moreover, according to this embodiment, since the comparison value C is used only for an initial prescribed number of times, whereupon an average value ARG is used, it is possible to reduce the frequency at which the stage number comparator 906 outputs the signals Sd, BRK, the frequency at which the transmission interval counter 901 halts the count, and so on, and therefore it is possible to reduce the power consumption of the interface control section 1220.

In the foregoing embodiments, the synchronization correction circuit relating to the present invention was described with reference to an example where it was applied to an audio data processing circuit for a Bluetooth system, but the present invention may also be employed in synchronization correction circuits for other types of data processing circuits, provided that these handle communication packets.

What is claimed is:

1. A synchronization correction circuit comprising:

synchronization signal generating section for successively receiving packets generated in accordance with a designated cycle, from an external source, and generating a packet synchronization signal in synchronization with the reception cycle of these packets; and interface control section for generating a transfer clock for each respective data element contained in said packets, on the basis of an internal clock, and making the cycle of said transfer clock corresponding to the last data element of said packet longer than the transfer clocks corresponding to the other data elements, if the actual cycle of said packet synchronization signal is longer than said designated cycle, and making the cycle of said transfer clock corresponding to the last data element of said packet shorter than the transfer clocks corresponding to the other data elements, if the actual cycle of said packet synchronization signal is shorter than said designated cycle.

2. The synchronization correction circuit according to claim 1, wherein said interface control section comprises:

a transmission interval counter for counting the clock number of a measurement clock and resetting the count value in accordance with said packet synchronization signal;

a detector for comparing the count result of said transmission interval counter with a comparison value specified in accordance with said designated cycle, and outputting a detection signal if this count result matches the comparison value; and a transfer clock generating section for resetting said transfer clock generation operation at the timing that said packet synchronization signal is input, and fixing the signal level of said transfer clock, when said detection signal is input.

3. The synchronization correction circuit according to claim 2, wherein said detector comprises:

a plurality of transmission interval comparators, for comparing the count result of said transmission interval counter with plural types of said comparison value corresponding respectively to plural types of said designated cycle;

and a type selector for selecting the output signal of the first transmission interval comparator corresponding to the designated cycle actually selected, from the output signals of said plurality of transmission interval comparators, and outputting a signal as a signal detection signal.

4. The synchronization correction circuit according to claim 2, wherein said detector comprises:

a transmission interval comparator for comparing the count result of said transmission interval counter with said comparison value specified according to a common multiple of a plural types of designated cycle, and outputting a signal as said detection signal.

5. The synchronization correction circuit according to claim 2, wherein said detector comprises:

a comparison value register for storing said comparison value;

a transmission interval comparator for comparing the count result of said transmission interval counter with said comparison value stored in said comparison value register;

a comparison stage number counter for counting the number of times that the count result of said transmission interval counter has reached said comparison value stored in said comparison value register;

a comparison stage number register for storing a comparison stage number; and a stage number comparator for comparing the count result of said comparison stage number counter with said comparison stage number, and outputting the comparison result as said detection signal.

6. The synchronization correction circuit according to claim 5, wherein said stage number comparator outputs said comparison result as an interrupt signal to a central processing unit.

7. The synchronization correction circuit according to claim 5, wherein said detector comprises:

an average value storage section for storing the average cycle of said packet synchronization signal; and a comparison value selector for selecting either the value stored in the average value storage section or said comparison value stored in said comparison value register, and supplying said either value to said transmission interval comparator.

8. The synchronization correction circuit according to claim 2, further comprising transfer synchronization signal generating section for generating a transfer synchronization signal for achieving transfer synchronization of said packets in word units, by using said transfer clock input from said transfer clock generating section.

* * * * *